US010304125B1

(12) United States Patent
Huisenga et al.

(10) Patent No.: US 10,304,125 B1
(45) Date of Patent: May 28, 2019

(54) METHOD AND SYSTEM FOR COLOR CAPTURE AND PRESENTATION ENHANCEMENT

(71) Applicant: Amazon Technologies, Inc., Seattle, WA (US)

(72) Inventors: Peter Ross Huisenga, Seattle, WA (US); Lindsay Evje Dankworth, Seattle, WA (US); Muge Erdirik Dogan, Seattle, WA (US); Matthew Edward Esparza, Seattle, WA (US); Janet Ellen Galore, Seattle, WA (US); Robert Allan Rautenberg, III, Kirkland, WA (US); Kara Clover Trousdale, Seattle, WA (US); Amirali Virani, Bellevue, WA (US); Daniel Joseph Walter, Seattle, WA (US); Charles Shearer Dorner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 608 days.

(21) Appl. No.: 15/055,281

(22) Filed: Feb. 26, 2016

(51) Int. Cl.
G06Q 30/00 (2012.01)
G06Q 30/06 (2012.01)
G06K 9/46 (2006.01)
G06T 7/40 (2017.01)
G06T 7/00 (2017.01)
G06K 9/62 (2006.01)
G06T 5/50 (2006.01)

(52) U.S. Cl.
CPC ....... G06Q 30/0643 (2013.01); G06K 9/4652 (2013.01); G06K 9/6215 (2013.01); G06T 5/50 (2013.01); G06T 7/0042 (2013.01); G06T 7/408 (2013.01)

(58) Field of Classification Search
CPC ............ G06Q 30/0643; G06K 9/4652; G06K 9/6215; G06T 5/50; G06T 7/0042; G06T 7/408
See application file for complete search history.

(56) References Cited

U.S. PATENT DOCUMENTS

2016/0275702 A1* 9/2016 Reynolds ............ G06F 3/04817

OTHER PUBLICATIONS https://www.autodesk.com/products/fusion-360/blog/making-it-look-good-apply-and-edit-materials-in-fusion360/ (Year: 2014).*

* cited by examiner

Primary Examiner — Matthew E Zimmerman
(74) Attorney, Agent, or Firm — Lee & Hayes, P.C.

(57) ABSTRACT

Creating color swatches associated with a product based on capturing an image of the product applied to a model substrate is described. In an example, an image of a product on a color display mechanism may be accessed. At least a portion of the color display mechanism may include a model substrate that is substantially similar to an intended application substrate for the product. A color swatch corresponding to the product may be determined based at least in part on the image. An enhanced image may be generated based at least partly on the color swatch. The enhanced image may be an image depicting the product applied to the intended application substrate in an environment of use that is modified to include a color associated with the color swatch in a region of the image corresponding to the product.

20 Claims, 7 Drawing Sheets

METHOD AND SYSTEM FOR COLOR CAPTURE AND PRESENTATION ENHANCEMENT

BACKGROUND

Color is a visual perceptual property corresponding to categories called red, blue, yellow, etc. Color derives from the spectrum of light interacting with light receptors in the eye having spectral sensitivities. Various properties such as light absorption, reflection, emission spectra, etc. may affect how color is perceived. In some examples, color is suspended in a medium such as, but not limited to, cream, lotion, powder, gloss, paint, stain, ink, etc. Color categories and physical specifications of color may be determined based on physical characteristics of the medium in which the color is suspended and/or the environment in which the color is situated. For instance, in some examples, color categories and physical specifications of color may be determined based on how a color that is suspended in the medium interacts with underlying color and/or physical characteristics of an application substrate.

The representation of colors presents particular problems in online settings. Color swatches can be associated with items such as cosmetics, e.g., lipstick or blush, to provide a representation of the colors of the actual items. Generally, current techniques for capturing color extract a color sample from an image of a product or an image of a product applied to a white background. For instance, current techniques extract a color sample from an image of lipstick and generate a digital color swatch based on the color sample. Or, current techniques extract a color sample from an image of lipstick applied to a white background to generate the digital color swatch. However, such color samples can be inaccurate and may misrepresent the color of the products during actual use of the products. Accordingly, color is difficult to accurately depict in online settings using current techniques.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
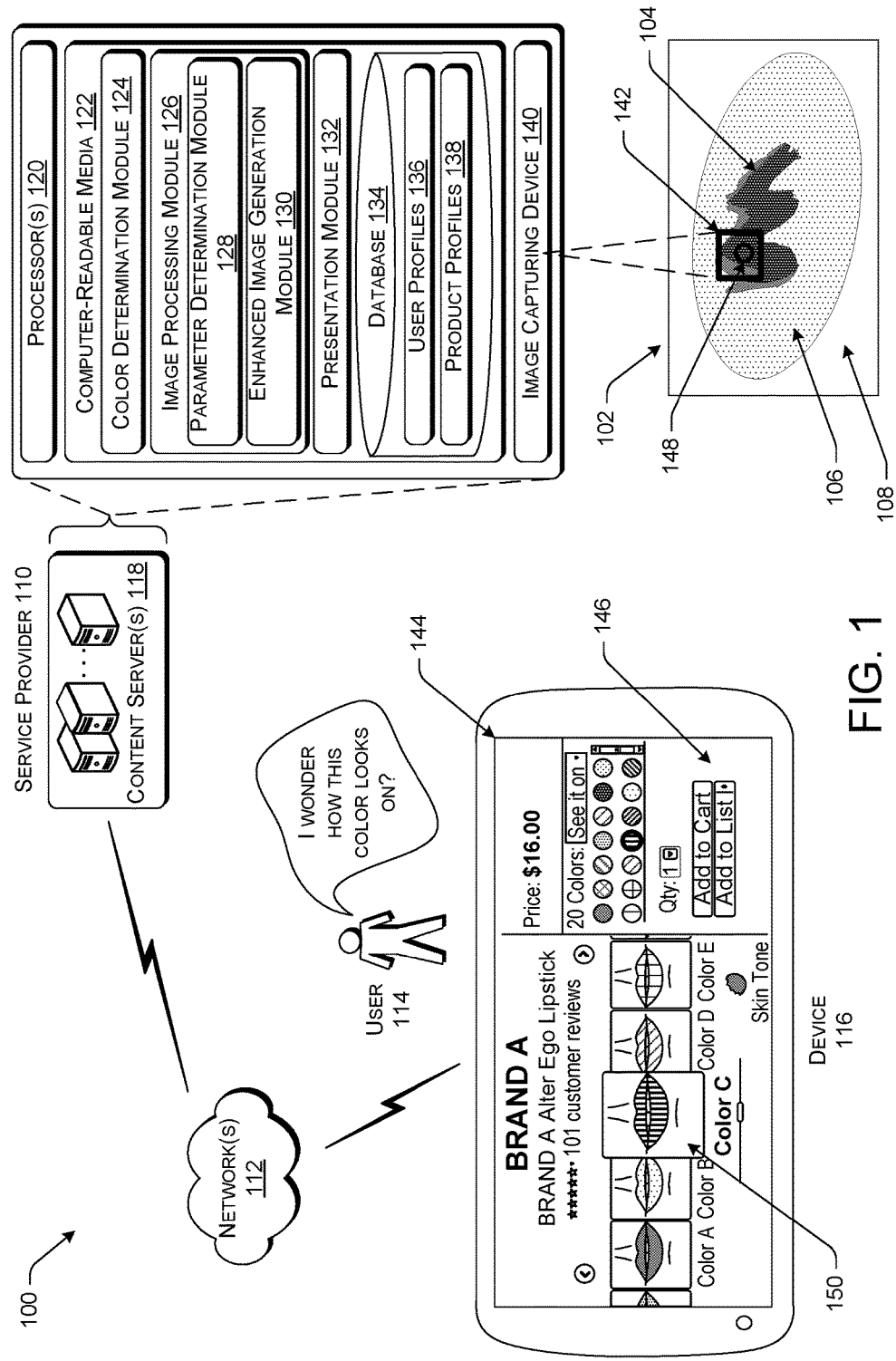
FIG. 1 is a diagram showing an example system for sourcing color swatches associated with a product based on capturing an image of the product applied to a substrate and/or situated in an environment that is substantially similar to a substrate and/or an environment that the product is likely to be applied and/or situated.

This disclosure describes sourcing color swatches associated with a product based on capturing an image of the product applied to a substrate and/or situated in an environment that is substantially similar to a substrate on which the product is likely to be applied and/or an environment in which the product is likely to be situated. A product may be applied on top of a substrate and/or situated in an environment such that one or more characteristics of the product, the substrate, and/or the environment affect the perceived color of the product. Non-limiting examples of a product include a cosmetic (e.g., lipstick, eye shadow, blush, foundation, nail polish, etc.), a paint, a stain, a tattoo ink, a transfer for a t-shirt, etc. Based at least in part on applying a product to a substrate that is substantially similar to the intended application substrate and/or situating the product in an environment that is substantially similar to the intended environment, a resulting color swatch may accurately resemble the color of the product on an intended application substrate or in an intended environment. For the purpose of this discussion, a color swatch may represent a group of pixels of slightly different colors that collectively are perceived as a color representative of the color of the product on an intended application substrate or in an intended environment. The resulting color swatch may represent the color of the product that may be perceived based at least in part on the product interacting with the intended application substrate and/or the intended environment.

In at least one example, color swatches may be utilized for generating enhanced images that may be incorporated into user interfaces. For the purpose of this discussion, an enhanced image is an image that has been subjected to one or more operations (i.e., processing) to manipulate portions of the image. That is, an enhanced image is an image of a product applied to an intended application substrate in an environment of use that has been modified to include a color corresponding to a color swatch in a portion of the image corresponding to the product. An enhanced image may accurately resemble the color of a product on an intended application substrate or in an intended environment. In some examples, enhanced images may be incorporated into user interfaces, as described above. The user interfaces may be configured to present information about products that are available for acquisition on behalf of service providers and/or merchants. In some examples, the user interfaces may be associated with product detail pages, as described below.

As a non-limiting example, a product may be lipstick. Lipstick appears to change color when applied to the lips of a user based on various characteristics associated with the lipstick and/or the user. That is, the lipstick in the lipstick tube appears to be a different color than the lipstick when applied to a user. For instance, the color of the lipstick may be affected by a color of the lips (e.g., skin tone), an opacity of the lipstick, a transparency of the lipstick, an absorbency of the lipstick, an absorbency of the lips, a texture of the lipstick, a texture of the lips (e.g., rough, smooth, etc.), a finish of the lipstick (e.g., matte, gloss, shimmer, etc.), a combination of the foregoing, etc. Techniques described herein may source a color swatch of lipstick from an image of the lipstick applied to a substrate that is substantially similar to the intended application substrate (i.e., lips). A service provider may utilize the color swatch to generate a user interface that is configured to present the lipstick to a user via a product detail page associated with an online retailer. In some examples, the color swatch may be utilized to generate an enhanced image, as described below.

As another non-limiting example, a product may be paint. Paint appears to change color when applied to a wall based on various characteristics of the paint and/or wall. For instance, a color of paint may be affected by a color of a wall, an opacity of the paint, a transparency of the paint, an absorbency of the paint, an absorbency of the wall, a texture of the paint, a texture of the wall (e.g., rough, smooth, etc.), a finish of the paint (e.g., matte, gloss, etc.), a finish of the wall (e.g., matte, gloss, etc.), etc. Techniques described herein may source a color swatch of paint from an image of the paint applied to a substrate that is substantially similar to the intended application substrate (i.e., a wall). A service provider may utilize the color swatch for generating a user interface configured to present the paint to a user via a product detail page associated with an online retailer. In some examples, the color swatch may be utilized to generate an enhanced image, as described below.

FIG. 1 is a diagram showing an example system 100 for sourcing color swatches associated with a product based on capturing an image of the product applied to a substrate and/or situated in an environment that is substantially similar to a substrate and/or an environment that the product is likely to be applied and/or situated.

In at least one example, a color display mechanism 102 may be used for displaying a product 104 in a way that is substantially similar to an intended application of the product 104. As described above, a product 104 may be applied to a substrate and/or situated in an environment such that one or more characteristics of the product 104, the substrate, and/or the environment affect the perceived color of the product 104. Accordingly, in at least one example, a color display mechanism 102 may be used for displaying a product 104 in a manner that causes the color to be perceived as if the product 104 has been applied to the intended application substrate and/or situated in an intended environment. In at least one example, the product 104 may be applied to the color display mechanism 102 in a manner consistent with typical use or expected use of the product 104. For instance, in a non-limiting example where the product 104 is a cosmetic product, the cream, gloss, lipstick, etc., the product 104 may be applied so to avoid layering the product 104 on too thick or too thin, in a quantity that is too much or too little, etc. That is, the product 104 may be applied to the color display mechanism 102 in such a manner to ensure that the coverage is consistent with the intended application.

In at least one example, a color display mechanism 102 may include a portion that is a model substrate 106 having one or more characteristics that are substantially similar to an intended application substrate for the product 104. The product 104 may be applied to the model substrate 106 and/or situated in an environment such that one or more characteristics of the product 104, the model substrate 106, and/or the environment affect the perceived color of the product 104. The one or more characteristics may include color, degree of transparency/degree of opacity, absorbency, texture, finish, etc. The one or more characteristics may affect the perceived color of the product 104 when applied to the intended application substrate 102. Accordingly, the greater the similarity between the model substrate 106 and the intended application substrate for the product 104, the more accurate the color may appear when applied to the model substrate 106 and subsequently depicted in an image.

Color, as described above, is a visual perceptual property corresponding to categories. Color derives from the spectrum of light interacting with light receptors in the eye having spectral sensitivities. The color of the model substrate 106 may be determined based on physical properties of the model substrate 106, including light absorption, reflection, emission spectra, etc. In at least one example, the color of the model substrate 106 may be substantially similar to the color of the intended application substrate for the product 104. That is, in at least one example, the color of the model substrate 106 may be within a threshold distance of the color of the intended application substrate for the product 104. In some examples, a material may have color variation within the material itself. In at least one example, the color of the model substrate 106 may include same or similar color variations as the intended application substrate for the product 104. The color of the model substrate 106 may affect the color of the product 104 in a substantially similar manner as the color of the intended application substrate affects the color of the product 104.

Transparency is a characteristic representative of a degree to which a material allows light to pass through such that objects behind the material can be distinctly seen. Material with a degree of transparency above a threshold may enable light to pass through such that objects behind the material can be clearly seen. Material with a degree of transparency below a threshold enable very little if any light to pass through such that the objects behind the material cannot be seen. That is, materials with a degree of transparency below a threshold lack transparency. Materials that are not transparent are opaque. Accordingly, transparency and opacity are complimentary characteristics. That is, a material with a degree of transparency above a threshold has a degree of opacity below a threshold and a material with a degree of transparency below a threshold has a degree of opacity above a threshold. In some examples, the model substrate 106 may have a substantially similar degree of transparency and/or degree of opacity as the intended application substrate for the product 104. The degree of transparency and/or degree of opacity of the model substrate 106 may affect the color of the product 104 in a substantially similar manner as the degree of transparency and/or degree of opacity of the intended application substrate affects the color of the product 104.

Absorbency is a characteristic representative of a degree to which a material is capable of absorbing heat, light, moisture, etc. That is, the absorbency of the model substrate 106 may determine the substrate's 106 capability to absorb heat, light, moisture, etc. In some examples, the model substrate 106 may absorb heat, light, moisture, etc. to substantially the same degree as the intended application substrate for the product 104. The absorbency of the model substrate 106 may affect the color of the product 104 in a substantially similar manner as the absorbency of the intended application substrate affects the color of the product 104. In at least one example, the absorbency of a product 104 may determine the product's 104 capability to absorb heat, light, moisture, etc. The absorbency of the product 104 may affect the color of the product 104 when applied to the intended application substrate and/or the model substrate 106.

Texture is a characteristic associated with the feel, appearance, or consistency of a material. As non-limiting examples, a material may have a rough texture, a course texture, a fuzzy texture, a slimy texture, a smooth texture, etc. In some examples, the model substrate 106 may have a substantially similar texture as the intended application substrate. The texture of the model substrate 106 may affect the color of the product 104 in a substantially similar manner as the texture of the intended application substrate affects the color of the product 104. In at least one example, the texture of the product 104 may affect the color of the product 104 when applied to the intended application substrate and/or the model substrate 106.

Finish is a characteristic associated with a substrate texture of a material. In some examples, a finish may be associated with a treatment or coating used to surface or finish a material. As non-limiting examples, a material may have a gloss finish, a shimmer finish, a matte finish, etc. In some examples, the model substrate 106 may have a substantially similar finish as the intended application substrate for the product 104. The finish of the model substrate 106 may affect the color of the product 104 in a substantially similar manner as the finish of the intended application substrate affects the color of the product 104. In at least one example, the product 104 may be associated with a finish, and the finish of the product 104 may affect the color of the product 104 when applied to the intended application substrate and/or the model substrate 106.

As a non-limiting example, if the product is lipstick, the product 104 may be applied to a color display mechanism 102 wherein at least a portion of the color display mechanism 102 includes a model substrate 106 having one or more characteristics that are substantially similar to lips (or skin). That is, the model substrate 106 may have a substantially similar color (i.e., skin tone), a substantially similar degree of opacity/degree of transparency, a substantially similar absorbency, a substantially similar texture, a substantially similar finish, etc. as lips. In at least one example, a colored latex-based material may be used for the model substrate 106. The color of the latex-based material may represent a skin tone. In some examples, the color may be a median color in a range of colors of an intended application substrate. For instance, in this lipstick example described above, the color may be a median skin tone that is representative of a range of skin tones. As a non-limiting example, the color may be Color-Hex color code #c08F80, PANTONE® Solid Coated 7613 C, or PANTONE® Solid Uncoated 7515 U. In other examples, the color may be specific to a particular skin tone.

In another non-limiting example, if the product 104 is nail polish, the product 104 may be applied to a color display mechanism 102 wherein at least a portion of the color display mechanism 102 includes a model substrate 106 having one or more characteristics that are substantially similar to finger nails. That is, the model substrate 106 may have a substantially similar color (i.e., skin tone), a substantially similar degree of opacity/degree of transparency, a substantially similar absorbency, a substantially similar texture, a substantially similar finish, etc. as finger nails. In such an example, the model substrate 106 may be positioned behind a mechanism such as an artificial nail that has a substantially similar curvature, a substantially similar color (i.e., skin tone), a substantially similar degree of opacity/degree of transparency, a substantially similar absorbency, a substantially similar texture, a substantially similar finish, etc. as a finger nail.

Or, in yet another non-limiting example, if the product 104 is stain for wood, the product 104 may be applied to a color display mechanism 102 wherein at least a portion of the color display mechanism 102 includes a model substrate 106 having one or more characteristics that are substantially similar to a piece of wood that is an intended application substrate. That is, the model substrate 106 may have a substantially similar color (e.g., substantially similar degree of separation of color, substantially similar variation, etc.), a substantially similar degree of opacity/degree of transparency, a substantially similar absorbency, a substantially similar texture, a substantially similar finish, etc. as a particular piece of wood.

In some examples, the model substrate 106 may be mounted on top of a supporting mechanism 108, as illustrated in FIG. 1. The model substrate 106 may be mounted on top of a supporting mechanism 108 using an adhesive and/or alternative adhering mechanisms. The supporting mechanism 108 may help keep the model substrate 106 flat and substantially wrinkle-free. That is, the supporting mechanism 108 may facilitate a smooth substrate area of the model substrate 106 for receiving the product 104. Furthermore, the supporting mechanism 108 may enable the model substrate 106 to be positioned at an angle to manipulate the amount of light reflected off of the model substrate 106. In such examples, the supporting mechanism 108 may have a color that minimally affects the color of the product 104. For instance, the supporting mechanism 108 may have a color that is within a threshold distance of the color of the model substrate 106. In other examples, the model substrate 106 may be positioned behind a mechanism for displaying the product 104. In yet additional and/or alternative examples, the model substrate 106 may stand alone and may not be associated with a supporting mechanism.

Color display mechanism 102 is but one example of a color display mechanism 102 and additional and/or alternative configurations and/or materials may be used for displaying a product 104 on a model substrate and/or in an environment substantially similar to an intended environment.

As described above, FIG. 1 is a diagram showing an example system 100 for sourcing color swatches associated with a product 104 based on capturing an image of the product 104 applied to a substrate and/or situated in an environment that is substantially similar to a substrate and/or an environment that the product 104 is likely to be applied and/or situated. More particularly, the system 100 may include a service provider 110, one or more network(s) 112, a user 114, and a device 116 corresponding to the user 114. In some examples, the user 114 may operate a device 116 to perform various functions associated with the device 116, which may include at least some of the operations and/or modules discussed below with respect to the service provider 110.

The service provider 110 may be any entity, server(s), platform, etc., that provides items (e.g., products, services, etc.) to the user 114 on behalf of merchants and/or service providers. The service provider 110 may be implemented in a non-distributed computing environment or may be implemented in a distributed computing environment, possibly by running some modules on devices 116 or other remotely located devices.

As shown, the service provider 110 may include one or more content server(s) 118, which may include one or more processor(s) 120 and computer-readable media 122. The content server(s) 118 may also include additional components not listed above that may perform any function associated with the content server(s) 118. In various embodiments, each of the content server(s) 118 may be any type of server, such as a network-accessible server. In various examples, the processor(s) 120 may execute one or more modules and/or processes to cause the content server(s) 118 to perform a variety of functions, as set forth above and explained in further detail in the following disclosure. In some embodiments, the processor(s) 120 may include a central processing unit (CPU), a graphics processing unit (GPU), both a CPU and a GPU, or other processing units or components known in the art. Additionally, each of the processor(s) 120 may possess its own local memory, which also may store program modules, program data, and/or one or more operating systems.

In at least one configuration, the computer-readable media 122 of the content server(s) 118 may include one or more modules and data structures including, for example, a color determination module 124, an image processing module 126, including a parameter determination module 128 and an enhanced image generation module 130, a presentation module 132, and a database 134. The database 134 may store data in user profiles 136, product profiles 138, etc., as described below. The one or more modules and data structures may be in the form of stand-alone applications, productivity applications, an operating system component, or any other application or software module having features that facilitate interactions between the devices 116 and the service provider 110. Depending on the exact configuration and type of the content server(s) 118, the computer-readable media 122 may also include volatile memory (such as RAM), non-volatile memory (such as ROM, flash memory, miniature hard drive, memory card, or the like), or some combination thereof.

In at least one example, the one or more content server(s) 118 may be associated with an image capturing device 140. The image capturing device 140 may be an imaging sensor that detects light waves or other electromagnetic radiation waves that pass through and/or reflect off of objects, converts the waves into signals, and conveys information that constitutes an image via the signals. Examples of imaging sensors include, but are not limited to, semiconductor charge-coupled devices (CCD) or active pixel sensors (e.g., complementary metal-oxide-semiconductor (CMOS) or N-type metal-oxide semiconductor (NMOS)). In some examples, the image capturing device 140 captures images of a product 104 applied to a color display mechanism 102, as described below (e.g., image 142). In other examples, the image capturing device 140 may capture additional and/or alternative images.

In various examples, the service provider 110 may present items to a user 114 on behalf of itself, merchants, etc. The items may include products 104, services, combinations of products 104 and services, etc. The network(s) 112 may facilitate communication between the content server(s) 118 and/or the devices 116 associated with the user 114. In some examples, the network(s) 112 may be any type of network known in the art, such as the Internet. Moreover, the service provider 110 and/or the devices 116 may communicatively couple to the network(s) 112 in any manner, such as by a wired or wireless connection.

The user 114 may interact with the service provider 110 via a site (i.e., a website), a self-service merchant portal, a self-service interface, or in any other manner. In at least one example, the user 114 may interact with the service provider 110 to acquire one or more items that are offered for acquisition on behalf of the merchants and/or the service provider 110. In some examples, the service provider 110 may generate and present user interfaces for presenting one or more items to a user 114. The user interfaces may be presented via a display 144 of a device 116 associated with a user 114. User interface 146 is a non-limiting example of a user interface configured to provide a user 114 with functionality to view how a particular color of lipstick looks when applied to lips. Leveraging the techniques described herein, the user interfaces may display color swatches determined based on capturing an image of a product 104 applied to a substrate and/or situated in an environment that is substantially similar to the substrate and/or the environment that the product 104 is likely to be applied and/or situated so that users (e.g., user 114) can accurately perceive the color of the product 104.

In various examples, a user 114 may acquire an item by actuating a control on a user interface presented on a display 144 of a device 116 to acquire the item. The control may be associated with a hyperlink or an overlay that directs the user 114 to a new user interface and prompts the user 114 to input information for acquiring the item (e.g., banking information, etc.). In at least one example, based at least in part on a user 114 acquiring an item, the user 114 may receive the item via physical mail or the user 114 may pick the item up at a physical store location associated with a merchant and/or service provider 110.

In at least one example, merchants may interact with the service provider 110 to offer one or more items for acquisition by a user 114. In various examples, the merchants may be any individual or entity that is a source or a distributor of items that may be acquired or used by the user 114. For example, the merchants may include entities that provide products or services to user 114, which may be offered or promoted directly by the merchants or by the service provider 110 or on behalf of the merchants. The merchants may also offer items via a physical location (e.g., a brick-and-mortar store, etc.), a merchant-branded merchant site (e.g., website), an intermediary marketplace, etc. The merchants may provide items to the user 114 with the assistance of any type of device (e.g., devices 116, etc.).

As described above, in at least one configuration, the computer-readable media 122 of the content server(s) 118 may include one or more modules and data structures including, for example, the color determination module 124, image processing module 126, including the parameter determination module 128 and the enhanced image generation module 130, the presentation module 132, and the database 134.

The color determination module 124 may determine a color swatch associated with a color of a product 104. For the purpose of this discussion, a color swatch may be representative of a color of a product 104 applied to an intended application substrate and/or situated in an intended environment. That is, a color swatch may accurately resemble the color of a product 104 as it is likely to interact with physical characteristics of an intended application substrate and/or intended environment. The color determination module 124 may access an image (e.g., image 142) associated with a product 104. In at least one example, the image (e.g., image 142) may depict the product 104, in a particular color, applied to a color display mechanism 102. More specifically, in some examples, the image (e.g., image 142) may depict the product 104 applied to the model substrate 106 of the color display mechanism 102. The color determination module 124 may select a portion of the image (e.g., image 142) associated with the product 104 as the color swatch for the particular color of the product 104. In at least one example, the portion of the image selected may be a portion of the image where at least a portion of the model substrate 106 is visible under the product 104 such that the product 104 is being affected by the characteristics of the model substrate 106. Additionally, the portion of the image selected may be a portion of the image that is not in a noticeable shadow or highlight to ensure that the color of the product 104 is representative of the product 104 interacting with the model substrate 106, excluding external factors. That is, the color determination module 124 may select a particular group of pixels corresponding to the product 104 in the image (e.g., image 142) as the color swatch representative of the particular color of the product 104. FIG. 1 resembles color swatch 148 as a portion of image 142. The color determination module 124 may average colors associated with individual pixels of the particular group of pixels to determine the color of the color swatch. Color swatches may be mapped to product profiles 138 stored in the database 134, described below.

In some examples, multiple color swatches may be determined for each color of a product 104. Individual of the color swatches may represent the color of a product 104 when the product 104 is applied in one or more layers. For instance, a user 114 may apply more than one layer of lipstick when applying lipstick and each layer may affect the perceived color of the lipstick. In other examples, a user 114 may apply multiple layers of nail polish when painting their nails and each layer may affect the perceived color of the nail polish. Or, a user 114 may apply multiple layers of paint or stain and each layer may affect the perceived color of the paint or stain. In such examples, a color swatch may be determined based at least in part on extracting a particular group of pixels from a portion of the image depicting the product 104 on the model substrate 106 where the product 104 has been applied in multiple layers. For instance, the color determination module 124 may determine a color swatch based on a particular group of pixels from a portion of the image depicting the product 104 on the model substrate 106 where the product 104 has been applied in two layers and at least a portion of the model substrate 106 is visible through the product 104. Additionally, the color determination module 124 may determine a color swatch based on a particular group of pixels from a portion of the image depicting the product 104 on the model substrate 106 where the product 104 has been applied in three layers and at least a portion of the model substrate 106 is visible through the product 104.

The image processing module 126 may process images to determine parameters associated with images depicting the product 104 applied to an intended application substrate and/or situated in an intended environment and/or to generate enhanced images. As described above, the image processing module 126 may include the parameter determination module 128 and the enhanced image generation module 130.

In at least one example, the parameter determination module 128 may access an image of the product 104 on an intended application substrate and/or situated in an intended environment. For the purpose of this discussion, the image of the product 104 on the intended application substrate and/or situated in an intended environment may represent a standard image. The parameter determination module 128 may process the standard image using image processing techniques to identify one or more parameters associated with the standard image. For instance, the one or more parameters may be associated with values corresponding to highlights and/or shadows caused by the physical characteristics of the intended application substrate and/or the intended environment. In at least one example, the one or more parameters may identify areas of highlights and/or shadows in the standard image and the density of the highlights and/or shadows in such areas. Image processing may include low-level image processing techniques (e.g., edge detection, motion estimation, feature extraction, filter optimization, optical flow optimization, image segmentation, etc.), high-level image processing techniques (e.g., object detection, object classification, key modeling decisions, etc.), etc. In a non-limiting example, the parameter determination module 128 may determine where highlights and/or shadows are present on a model depicted in a standard image. Data associated with the highlights and/or shadows, or other parameters, may be stored in the database 134 associated with a product profile 138 corresponding to the product 104. In at least one example, the data associated with the highlights and/or shadows, or other parameters, may be associated with one or more algorithms that are stored in the database 134. The one or more algorithms may be executed by the enhanced image generation module 130 to cause one or more layers to be applied to background images to generate enhanced images, as described below.

In some examples, the parameter determination module 128 may access a set of standard images associated with a product 104. Each standard image in the set of standard images may be associated with a same subject but, in some examples, the product 104 may vary by some characteristic in each standard image. For instance, in a non-limiting example, if the product 104 is lipstick, a first standard image in the set of standard images may resemble a model wearing color A of a gloss lipstick, a second standard image in the set of standard images may resemble the model wearing color A of a matte lipstick, a third standard image in the set of standard images may resemble the model wearing color A of a shimmery lipstick, etc. The parameter determination module 128 may process the first standard image, the second standard image, and the third standard image to identify highlights and/or shadows caused by the physical characteristics of the intended application substrate and/or the product 104. That is, in at least one example, the parameter determination module 128 may determine where highlights and/or shadows are present on the model depicted in the first standard image, the second standard image, and the third standard image. In additional and/or alternative examples, the parameter determination module 128 may process the first standard image, the second standard image, or the third standard image to identify other parameters associated with each image in the set of standard images. Data associated with the highlights and/or shadows, or other parameters, may be stored in the database 134 associated with a product profile 138 corresponding to the product 104, as described below. In at least one example, the data associated with the highlights and/or shadows, or other parameters, may be associated with one or more algorithms that are stored in the database 134. The one or more algorithms may be executed by the enhanced image generation module 130 to cause one or more layers to be applied to background images to generate enhanced images, as described below.

The enhanced image generation module 130 may generate an enhanced image associated with a product 104. As described above, an enhanced image is an image that has been subjected to one or more operations (i.e., processing) to manipulate portions of the image. For instance, an enhanced image may be an image associated with one or more layers, including but not limited to a highlight layer, a shadow layer, and/or a layer associated with a color swatch. In a non-limiting example, an enhanced image may be an image of a lips covered with lipstick and the image may be associated with a layer corresponding to a color swatch that affects the color of the lipstick in the image, as illustrated in enhanced image 150. Furthermore, the image may be layered with one or more other layers that affect highlights, shadows, and/or other qualities to enhance the image. Or, an enhanced image may be an image of a wall and the image may be layered with a color swatch that affects the color of the wall. Furthermore, the image may be layered with one or more other layers that affect highlights, shadows, and/or other qualities to enhance the image.

For the purpose of this discussion, the image that is subjected to the one or more operations to generate the enhanced image may be called a background image. In some examples, the background image may be a same image as a standard image, described above. That is, in some examples, the background image may be an image of a product 104 on an intended application substrate and/or in an intended environment. In at least one example, the background image may be an image of a product 104 on an intended application substrate in a use environment. That is, in some examples, the background image may be an image of a product 104 on an intended application substrate and subject matter that provides context for the intended use. For instance, in a non-limiting example, a background image depicting a model wearing lipstick, facial features proximate to the lips may be included in the background image to provide context as to what the product 104 looks like in use.

Each product 104 may be associated with at least one background image. That is, a background image may be mapped to, or otherwise associated with, a product profile 138 in the database 134, as described below. In some examples, a same background image may be processed to resemble different characteristics so that a user 114 may consider the product 104 with its various characteristics. That is, different layers may be applied to a background image to resemble different characteristics associated with the product 104 and/or the intended application substrate. For instance, a same background image may be processed such that different layers interact with the background image so that a user 114 may consider different colors of a product 104. The color of each layer may be determined based at least in part on a determined color swatch, as described above.

The enhanced image generation module 130 may access the database 134 and access data associated with the product 104 that is stored in a corresponding product profile 138. For instance, the enhanced image generation module 130 may access a background image associated with the product 104. In at least one example, the enhanced image generation module 130 may determine a region of the background image associated with the product 104. In some examples, the region may be determined by a manual process. In other examples, the region may be determined by the enhanced image generation module 130 based at least in part on features associated with the background image (e.g., points, edges, objects, etc.). The enhanced image generation module 130 may mask portions of the background image such to identify the region of the background image that is associated with the product 104. A mask may hide a portion of an image from a layer. Based at least in part on masking portions of the background image, the region of the background image that is associated with the product 104 may be subject to various layers that affect the appearance of the product 104 but do not affect other portions of the background image.

In at least one example, the enhanced image generation module 130 may position a layer associated with a color under a layer associated with the background image. The layer associated with the color may affect the portion of the background image corresponding to the product 104. As described above, a color associated with the layer may be determined based at least in part on a color swatch (e.g., color swatch 148), as determined by the color determination module 124. The enhanced image generation module 130 may access a color swatch corresponding to the product 104. That is, the enhanced image generation module 130 may cause a layer associated with the color swatch to be positioned under the layer associated with the background image such that the region of the background image corresponding to the product 104 is associated with the color of the color swatch. As a non-limiting example, the enhanced image generation module 130 may determine the location of lipstick on a subject depicted in a background image on the subject's lips, and may cause a layer associated with a color swatch to be applied under the background image such that the lipstick in the enhanced image is the color of the color swatch. Or, as another non-limiting example, the enhanced image generation module 130 may determine a location of blush as applied to a subject depicted in a background image, and may cause a layer associated with a color swatch to be applied under the background image such that the blush applied to the subject in the enhanced image is the color in the color swatch.

The enhanced image generation module 130 may perform additional and/or alternative image processing techniques to modify the presentation of the enhanced image. The image processing techniques may further modify the presentation of the enhanced image such to improve the accuracy of the depiction of the product 104. For instance, the enhanced image generation module 130 may access data associated with the highlights and/or shadows, or other parameters, that is mapped to, or other otherwise associated with the product 104, and may position additional layers on top of the layer associated with the background image to modify the presentation of the enhanced image. In at least one example, the highlights and/or shadows, or other parameters, may be associated with one or more algorithms that are stored in the database 134. The enhanced image generation module 130 may execute the one or more algorithms to determine the one or more layers to be applied to a background image to generate an enhanced image.

In additional and/or alternative examples, the enhanced image generation module 130 may position additional and/or alternative layers on top of or under the background image to modify the presentation of the enhanced image, as described above. In some examples, the enhanced image generation module 130 may access layers associated with textures or finishes to enhance the background image. Such layers may be positioned on top of the layer associated with the background image. Or, the enhanced image generation module 130 may access layers for darkening or lightening the color of the product 104 based at least in part on variations of the color of the intended application substrate. In at least one example, such layers may be positioned on top of the layer associated with the background image but under the layer associated with the highlights and/or shadows, or other parameters. Based at least in part on the image processing of the background image, the enhanced image generation module 130 may generate enhanced images that accurately resemble how a product 104 appears on an intended application substrate in a use environment. Each enhanced image associated with a product 104 may be mapped, or otherwise associated with, the product 104 and stored in the database 134 in a corresponding product profile 138, as described below.

The presentation module 132 may generate user interfaces that provide functionality for the user 114 to select a product 104 and receive information about how the product 104 is likely to appear on an intended application substrate. In FIG. 1, user interface 146 illustrates a product detail page associated with a lipstick that can be displayed via a display 144 of a device 116. The presentation module 132 may cause the user interfaces (e.g., user interface 146) to be presented to the user 114 via a website, text message, an email, a push notification, etc. The presentation module 132 may generate user interfaces that improve the ability of the service provider 110 to display information that accurately resembles the intended application of a product 104 and enable the user 114 to interact with the service provider 110. That is, by utilizing the color swatches determined based at least in part on an image of the product 104 applied to a substrate and/or situated in an environment substantially similar to a substrate and/or an environment that the product 104 is likely to be applied and/or situated, the presentation module 132 may generate user interfaces that improve the ability of the service provider 110 to display information that accurately resembles the intended application of a product 104, and enable the user 114 to interact with the service provider 110.

In at least one example, the presentation module 132 may determine a product 104 that is likely to be of interest to a user 114. The presentation module 132 may access a corresponding product profile 138 to access enhanced images mapped to, or otherwise associated with, the product 104. In at least one example, the presentation module 132 may cause at least one of the enhanced images corresponding to the product 104 to be presented on the user interface (e.g., user interface 146). In some examples, the presentation module 132 may access an enhanced image that has been previously generated and stored in the database 134. In other examples, the presentation module 132 may cause an enhanced image to be generated in real time or near real time, as described below.

The database 134 may store data that is organized so that it may be accessed, managed, and updated. In at least one example, the database 134 may include data associated with an individual user 114 that may be arranged in user profiles 136. Additionally, the database 134 may include data associated with individual products 104 that may be arranged in product profiles 138.

As described above, the database 134 may include data associated with an individual user 114 that may be arranged in user profiles 136. In some examples, a user profile 136 may correspond to a retail purchase account associated with the service provider 110. A user profile 136 may have various data items associated with user 114 which may be mapped to, or otherwise associated with, the user profile 136. The data items associated with the user 114 may be received from a variety of sources including the user 114, the merchants, the service provider 110, etc. The data items stored in the user profiles 136 may include user information including, but not limited to, user demographics, user preferences, etc. The data items stored in the user profiles 136 may include user information and/or user actions associated with a retail purchase account corresponding to a user 114 (e.g., redemptions, purchases, sales, reservations, items on a saved-items list (i.e., a wish-list), exchanges, returns, browsing history, search history, recommendations, personal demographic information, location proximity, calendar information, etc.). Furthermore, the data items stored in the user profiles 136 may include data associated with user information and/or user actions associated with third-party sources and systems (e.g., social networks, professional networks, partner webstore purchases, etc.).

Furthermore, as described above, the database 134 may include data associated with individual products 104 that may be arranged in product profiles 138. A product profile 138 may correspond to a product 104 that is mapped to, or otherwise associated with, various data items. The various data items include data associated with the product 104, including but not limited to, a brand associated with the product 104, a cost of the product 104, colors available for the product 104, characteristics of the product 104, ingredients in the product 104, etc. Additionally and/or alternatively, the various data items include, but are not limited to, data associated with one or more background images associated with the product 104, one or more parameters determined from a standard image, color swatches associated with the colors available for the product 104, previously generated enhanced images that are associated with the product 104, etc. In at least one example, each color available for the product 104 may be associated with one or more color swatches. Individual color swatches of the one or more color swatches may be associated with an intended application substrate having a unique characteristic. In a non-limiting example, if the product 104 is lipstick, each individual color swatch may be associated with a different skin tone. Or, in another non-limiting example, if the product 104 is stain, each individual color swatch may be associated with a different type of wood. As described above, some of the color swatches may be associated with multiple layers of the product 104 on the model substrate 106 to resemble how multiple layers may affect the perceived color of the product 104.

FIGS. 2-7 describe example processes for creating color swatches associated with a product 104 based on capturing an image of the product 104 applied to a substrate and/or situated in an environment that is substantially similar to a substrate and/or an environment that the product 104 is likely to be applied and/or situated, and generating enhanced images and/or user interfaces based at least in part on the color swatches. The example processes are described in the context of the environment of FIG. 1 but are not limited to that environment. The processes are illustrated as logical flow graphs, each operation of which represents a sequence of operations that may be implemented in hardware, software, or a combination thereof. In the context of software, the operations represent computer-executable instructions stored on one or more computer-readable media 122 that, when executed by one or more processors 120, perform the recited operations. Generally, computer-executable instructions include routines, programs, objects, components, data structures, and the like that perform particular functions or implement particular abstract data types.

The computer-readable media 122 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media appropriate for storing electronic instructions. In addition, in some embodiments the computer-readable media 122 may include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks. The order in which the operations are described is not intended to be construed as a limitation, and any number of the described operations may be combined in any order and/or in parallel to implement the process. Furthermore, the operations described below may be implemented on a single device or multiple devices.

Figure 2:
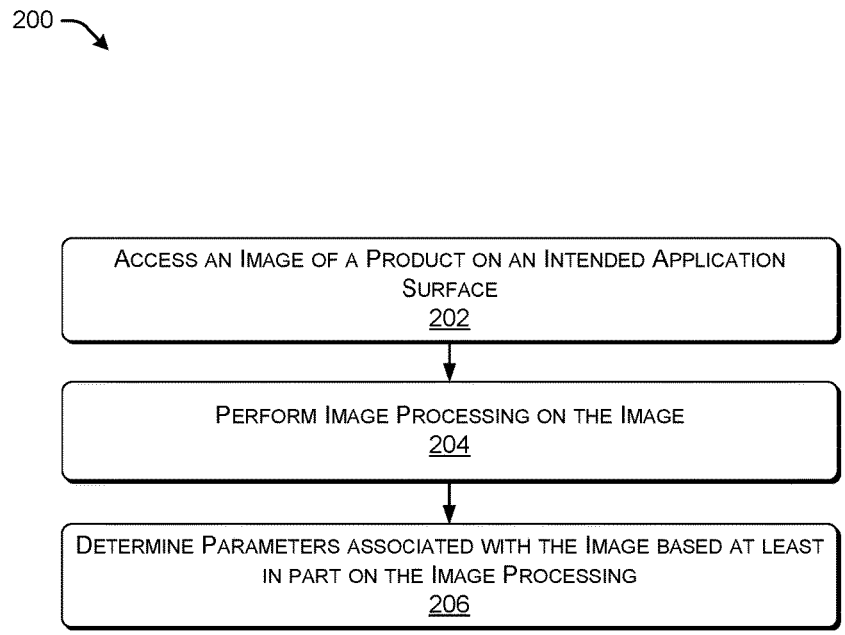
FIG. 2 is a flow diagram showing an illustrative process to determine one or more parameters associated with an image of a product on an intended application substrate.

FIG. 2 is a flow diagram showing an illustrative process 200 to determine one or more parameters associated with an image of a product on an intended application substrate.

Block 202 illustrates accessing an image of a product 104 on an intended application substrate. In at least one example, the parameter determination module 128 may access a standard image associated with the product 104, as described above. That is, the parameter determination module 128 may access an image of the product 104 on an intended application substrate and/or situated in an intended environment, as described above. For instance, in a non-limiting example, the parameter determination module 128 may access an image of a model wearing lipstick (i.e., the product 104).

Block 204 illustrates performing image processing on the image. The parameter determination module 128 may process the standard image using image processing techniques to identify parameters associated with the standard image. As described above, image processing may include low-level image processing techniques, high-level image processing techniques, etc.

Block 206 illustrates determining parameters associated with the image based at least in part on the image processing. The parameter determination module 128 may process the standard image using image processing techniques to identify parameters associated with the standard image, as described above. For instance, the parameters may be associated with values corresponding to highlights and/or shadows caused by the physical characteristics of the intended application substrate and/or an intended environment. In at least one example, the parameter determination module 128 may determine where highlights and/or shadows are present on the model depicted in a standard image and/or the density of the highlights and/or shadows in the standard image, described above. Data associated with the highlights and/or shadows, or other parameters, may be stored in the database 134 associated with a product profile 138 corresponding to the product 104. In at least one example, the highlights and/or shadows, or other parameters, may be associated with one or more algorithms that are stored in the database 134. The enhanced image generation module 130 may execute the one or more algorithms to cause one or more layers to be applied to background images to generate enhanced images, as described herein.

Figure 3:
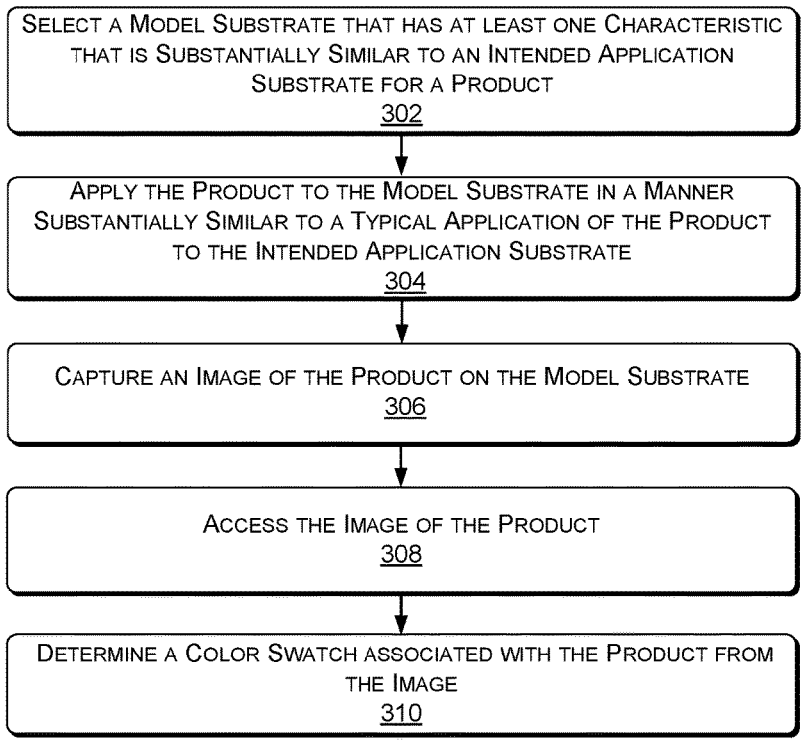
FIG. 3 is a flow diagram showing an illustrative process to determine a color swatch from an image of a product on a color display mechanism.

FIG. 3 is a flow diagram showing an illustrative process 300 to determine a color swatch from an image of a product 104 on a color display mechanism 102.

Block 302 illustrates selecting a model substrate 106 that has at least one characteristic that is substantially similar to an intended application substrate for a product 104. As described above, in at least one example, a color display mechanism 102 may include a portion that is a model substrate 106 having one or more characteristics that are substantially similar to an intended application substrate for the product 104. The product 104 may be applied to the model substrate 106 and/or situated in an environment such that one or more characteristics of the product 104, the model substrate 106, and/or the environment affect the perceived color of the product 104. The one or more characteristics may include color, degree of transparency/degree of opacity, absorbency, texture, finish, etc. The one or more characteristics may affect the perceived color of the product 104 when applied to the intended application substrate 102. Accordingly, the greater the similarity between the model substrate 106 and the intended application substrate for the product 104, the more accurate the color may appear when applied to the model substrate 106 and subsequently depicted in an image.

Block 304 illustrates applying the product 104 to the model substrate 106 in a manner substantially similar to a typical application of the product 104 to the intended application substrate. In at least one example, the product 104 may be applied to the model substrate 106 consistent with typical use or expected use of the product 104. For instance, in a non-limiting example where the product is a cosmetic product, the cream, gloss, lipstick, etc. may be applied so to avoid layering the cosmetic product on too thick or too thin, in a quantity that is too much or too little, etc. That is, the product 104 may be applied to the model substrate 106 in such a manner to ensure that the coverage is consistent with the intended application.

Block 306 illustrates capturing an image of the product 104 on the model substrate 106. As described above, the one or more content server(s) 118 may be associated with an image capturing device 140. In some examples, the image capturing device 140 may capture images of a product 104 applied to a color display mechanism 102, as described above (e.g., image 142). That is, in some examples, the image capturing device 140 may capture an image of the product 104 applied to the model substrate 106, as described above.

Block 308 illustrates accessing the image of the product 104. The color determination module 124 may access an image (e.g., image 142) associated with a product 104, as described above. In at least one example, the image (e.g., image 142) may resemble the product 104, in a particular color, applied to a color display mechanism 102.

Block 310 illustrates determining a color swatch associated with the product 104 from the image. The color determination module 124 may determine a color swatch associated with a color of a product 104. As described above, a color swatch may be a group of pixels of different colors that collectively represent a color of a product 104 applied to an intended application substrate and/or situated in an intended environment. The color determination module 124 may select a portion of the image (e.g., image 142) associated with the product 104 as the color swatch for the particular color of the product 104. In at least one example, the portion of the image selected may be a portion of the image where at least a portion of the model substrate 106 is visible under the product 104 such that the product 104 is being affected by the characteristics of the model substrate 106. Additionally, the portion of the image selected may be a portion of the image that is not in a noticeable shadow or highlight to ensure that the color of the product 104 is representative of the product 104 interacting with the model substrate 106, excluding external factors. That is, the color determination module 124 may select a particular group of pixels corresponding to the product 104 in the image (e.g., image 142) as the color swatch representative of the particular color of the product 104. FIG. 1 resembles color swatch 148 as a portion of image 142. The color determination module 124 may average colors associated with individual pixels of the particular group of pixels to determine the color of the color swatch. Color swatches may be mapped to product profiles 138 stored in the database 134, as described above.

Figure 4:
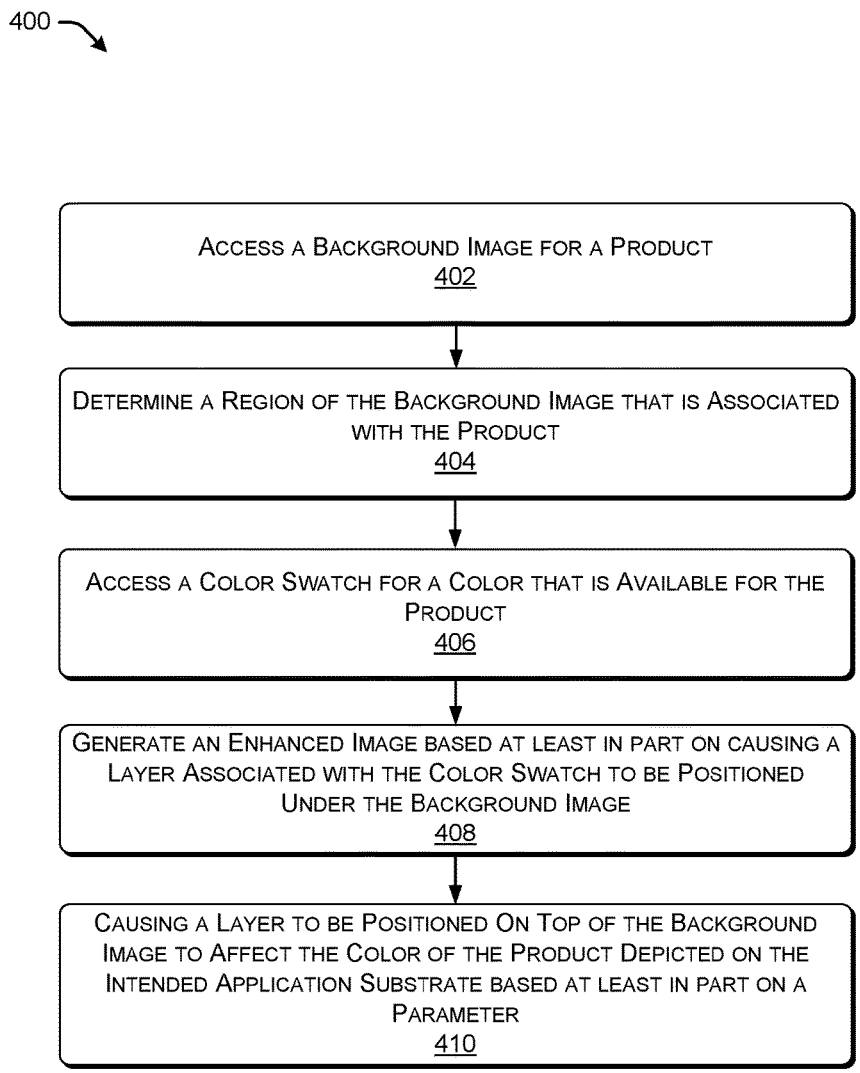
FIG. 4 is a flow diagram showing an illustrative process to generate an enhanced image of a product on an intended application substrate.

FIG. 4 is a flow diagram showing an illustrative process 400 to generate an enhanced image of a product 104 on an intended application substrate. The enhanced image generation module 130 may generate an enhanced image associated with a product 104. As described above, an enhanced image is an image that has been subjected to one or more operations (i.e., processing) to manipulate portions of the image. For instance, an enhanced image may be a background image associated with a highlight layer, a shadow layer, and/or a layer associated with a color swatch. Additional and/or alternative layers may also be applied to a background image to affect additional and/or alternative modifications to the background image.

Block 402 illustrates accessing a background image for a product 104. As described above, an image that is subjected to the one or more operations to generate the enhanced image may be called a background image. In some examples, the background image may be a same image as a standard image, described above. That is, in some examples, the background image may be an image of a product 104 on an intended application substrate and/or in an intended environment. As described above, the background image may be an image of a product 104 on an intended application substrate in a use environment. In at least one example, the enhanced image generation module 130 may access the database 134 and access data associated with the product 104 that is stored in a corresponding product profile 138. For instance, the enhanced image generation module 130 may access a background image that is mapped to, or otherwise associated with, the product 104.

Block 404 illustrates determining a region of the background image that is associated with the product 104. In at least one example, the enhanced image generation module 130 may determine a region corresponding to the product 104 as applied to the intended application substrate in the background image. In some examples, the region may be determined by a manual process. In other examples, the region may be determined by the enhanced image generation module 130 based at least in part on features associated with the background image (e.g., points, edges, objects, etc.). The enhanced image generation module 130 may mask portions of the background image such to identify the region of the background image that is associated with the product 104. A mask may hide a portion of an image from a layer. Based at least in part on masking portions of the background image, the region of the background image that is associated with the product 104 may be subject to various layers that affect the appearance of the product 104 but do not affect other portions of the background image.

Block 406 illustrates accessing a color swatch for a color that is available for the product 104. As described above, the color determination module 124 may determine a color swatch (i.e., a group of pixels of different colors) associated with a color of a product 104. In at least one example, the enhanced image generation module 130 may access a color swatch that is mapped to, or otherwise associated with, the product 104 in the database 134.

Block 408 illustrates generating an enhanced image based at least in part on causing a layer associated with the color swatch to be positioned under the background image. In at least one example, the enhanced image generation module 130 may cause a layer associated with the color swatch to be positioned under a layer associated with the background image such that the region of the background image corresponding to the product 104 is associated with the color of the color swatch. That is, the region of the enhanced image associated with the product 104 is modified to depict the color associated with the color swatch.

Block 410 illustrates causing a layer to be positioned on top of the background image to affect the color of the product 104 depicted on the intended application substrate based at least in part on a parameter. As described above, the enhanced image generation module 130 may perform various image processing techniques to modify the presentation of the enhanced image. As described above, image processing may include low-level image processing techniques, high-level image processing techniques, etc. The image processing techniques may modify the enhanced image such to improve the accuracy of the color of the product 104 as it is depicted in the enhanced image. For instance, the enhanced image generation module 130 may access data associated with the highlights and/or shadows, or other parameters, that is mapped to, or other otherwise associated with the product 104, and may cause additional layers to be positioned on top of the layer associated with the background image to affect the color of the product 104 based at least in part on the parameters associated with the highlights and/or shadows. In at least one example, the highlights and/or shadows, or other parameters, may be associated with one or more algorithms that are stored in the database 134. The one or more algorithms may be executed by the enhanced image generation module 130 to determine the one or more layers to be applied to a background image to further enhance the background image.

In additional and/or alternative examples, the enhanced image generation module 130 may position additional and/or alternative layers on top of or under the background image to modify the presentation of the enhanced image, as described above. For instance, the enhanced image generation module 130 may access layers associated with textures or finishes to enhance the background image. Or, the enhanced image generation module 130 may access layers for darkening or lightening the color of the product 104 based at least in part on variations of the color of the intended application substrate. Based at least in part on the image processing of the background image, the enhanced image generation module 130 may generate an enhanced image that accurately resembles how a product 104 appears on an intended application substrate. Each enhanced image associated with a product 104 may be mapped, or otherwise associated with, a product 104 and stored in the database 134 in a corresponding product profile 138, as described below.

Figure 5:
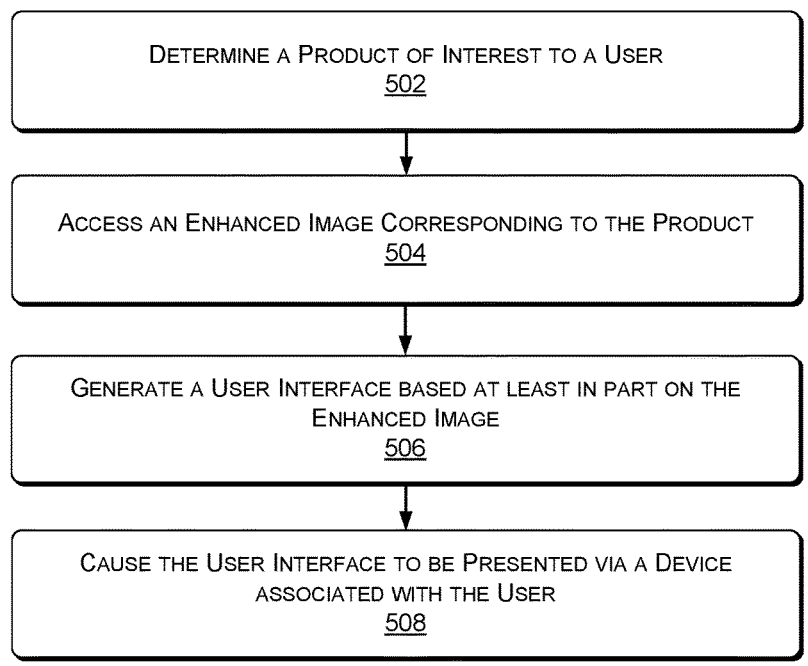
FIG. 5 is a flow diagram showing an illustrative process to generate a user interface utilizing an enhanced image and causing the user interface to be presented via a device associated with a user.

FIG. 5 is a flow diagram showing an illustrative process 500 to generate a user interface utilizing an enhanced image and causing the user interface to be presented via a device 116 associated with a user 114.

Block 502 illustrates determining a product 104 that is likely to be of interest to a user 114. In at least one example, the presentation module 132 may determine a product 104 that is likely to be of interest to the user 114. The presentation module 132 may access data corresponding to user information associated with the user 114 from user profiles 136 stored in the database 134, cloud storage system, or other data repository. Based at least in part on accessing the data corresponding to the user information, the presentation module 132 may utilize data associated with a retail purchase account associated with the user 114 to identify a product of interest to the user 114. For instance, the presentation module 132 may determine that a product on a saved-items list (i.e., a wish-list) is a product of interest, a product in a browsing history and/or search history associated with the retail purchase account is a product of interest, etc.

In additional and/or alternative examples, the presentation module 132 may determine that a product presented via a product page is a product of interest to the user 114 based at least in part on determining a number of times that the user 114 visited the product page. If the user 114 visits the product page a number of times above a threshold number, the presentation module 132 may determine that the corresponding product is a product of interest. In some examples, presentation module 132 may determine that a product presented via a product page is a product of interest based at least in part on determining that the user 114 visited a product page a number of times above a threshold number within a period of time. Or, the presentation module 132 may determine that a product 104 is a product of interest to a user 114 based at least in part on determining that the amount of time that the user 114 spends on a product page is above a threshold amount of time. Moreover, the presentation module 132 may determine that a product 104 is a product of interest based at least in part on determining that the user 114 is currently interacting with and/or dwelling on the product page corresponding to the product 104. Additional and/or alternative means for determining that a product 104 is a product of interest are available.

Block 504 illustrates accessing an enhanced image corresponding to the product 104. The presentation module 132 may access product profile 138 corresponding to the product 104 to access enhanced images that are mapped to, or otherwise associated with, the product 104.

Block 506 illustrates generating a user interface based at least in part on the enhanced image. The presentation module 132 may generate user interfaces that provide functionality for the user 114 to select a product 104 and receive information about how the product 104 is likely to appear on an intended application substrate. The user interfaces may include at least one enhanced image. In FIG. 1, user interface 146 illustrates a product detail page associated with a lipstick that can be displayed via a display 144 of a device 116. In some examples, a user interface may include a plurality of enhanced images associated with the product 104. In such examples, each enhanced image of the plurality of enhanced images may be associated with a unique characteristic (e.g., color, wood, etc.). As a non-limiting example, if the product 104 is lipstick, each enhanced image of the plurality of enhanced images may be associated with a unique color of the lipstick and/or a unique finish of the lipstick. In FIG. 1, user interface 146 illustrates a product detail page associated with a lipstick that includes a plurality of enhanced images and each enhanced image corresponds to a unique color of the lipstick.

Block 508 illustrates causing a user interface to be presented via a device 116 associated with a user 114. The presentation module 132 may cause the user interfaces (e.g., user interface 146) to be presented to the user 114 via a website, text message, an email, a push notification, etc. The presentation module 132 may generate user interfaces that improve the ability of the service provider 110 to display information that accurately resembles the intended application of a product 104 and enable the user 114 to interact with the service provider 110. That is, by utilizing the color swatches determined based at least in part on an image of the product 104 applied to a substrate and/or situated in an environment that is substantially similar to the substrate and/or the environment that the product 104 is likely to be applied and/or situated, the presentation module 132 may generate user interfaces that improve the ability of the service provider 110 to display information that accurately resemble the intended application of a product 104, and enable the user 114 to interact with the service provider 110.

Figure 6:
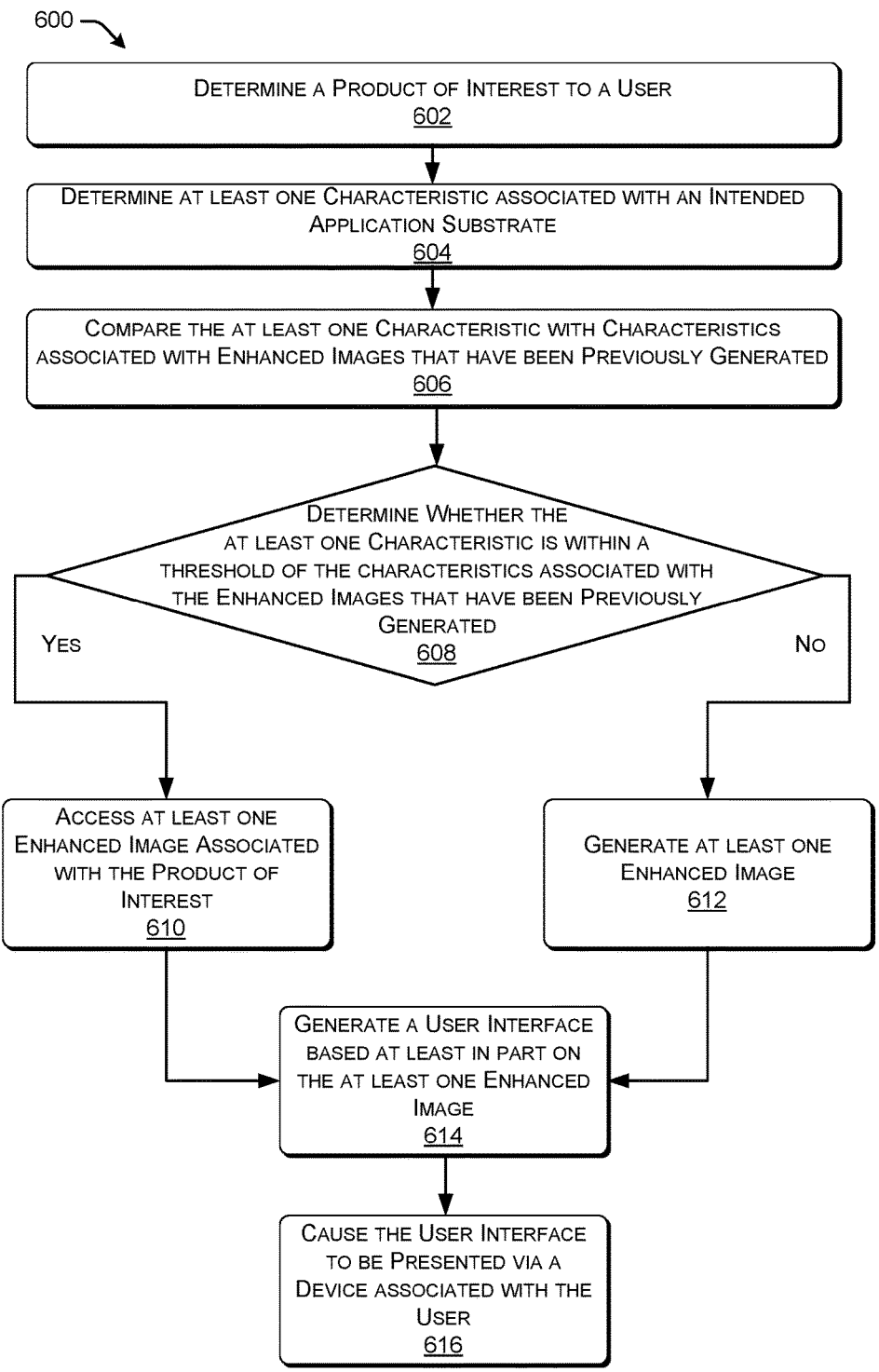
FIG. 6 is a flow diagram showing another illustrative process to generate a user interface utilizing an enhanced image and causing the user interface to be presented via a device associated with a user.

FIG. 6 is a flow diagram showing another illustrative process 700 to generate a user interface utilizing an enhanced image and causing the user interface to be presented via a device 116 associated with a user 114.

Block 602 illustrates determining a product 104 that is likely to be of interest to a user 114. In at least one example, the presentation module 132 may determine a product 104 that is likely to be of interest to the user 114, as described above. The presentation module 132 may access data corresponding to user information associated with the user 114 from user profiles 136 stored in the database 134, cloud storage system, or other data repository. Based at least in part on accessing the data corresponding to the user information, the presentation module 132 may utilize data associated with a retail purchase account associated with the user 114 to identify a product of interest to the user 114. For instance, the presentation module 132 may determine that a product on a saved-items list (i.e., a wish-list) is a product of interest, a product in a browsing history and/or search history associated with the retail purchase account is a product of interest, etc. Additional and/or alternative means for determining that a product 104 is a product of interest are available and are described above.

Block 604 illustrates determining at least one characteristic associated with an intended application substrate. Intended application substrates may vary based on one or more characteristics, as described above. For instance, intended application substrates may vary by color (degree of separation from the color of the product 104 and/or color variation within an intended application substrate), degree of opacity/degree of transparency, absorbency, texture, finish, combinations of the foregoing, etc. In some examples, the presentation module 132 may determine the at least one characteristic by selecting a default characteristic, or a characteristic that represents a median within a range of characteristic variation. In other examples, the presentation module 132 may determine the at least one characteristic by selecting a characteristic that is determined to be the most popular (e.g., requested above a threshold number of times, requested at a frequency above a threshold, etc.). In yet additional and/or alternative examples, the presentation module 132 may randomly determine the at least one characteristic.

As a non-limiting example, if the product 104 is lipstick, the presentation module 132 may determine the at least one characteristic to be color. That is, the presentation module 132 may determine a color associated with the intended application substrate (i.e., lips). In some examples, the color may represent a default skin tone, or a skin tone that is a median skin tone in a range of skin tones. In other examples, the color may represent a skin tone requested above a threshold or the presentation module 132 may determine a skin tone randomly, as described above.

In at least one example, the presentation module 132 may determine the at least one characteristic based at least in part on input received from the user 114. In some examples, a user 114 may indicate the at least one characteristic based at least in part on an interaction with a user interface. In at least one example, a user interface configured to provide information associated with a product 104 to a user 114 may include a mechanism (e.g., control, hyperlink, overlay, etc.) that enables the user 114 to select characteristics associated with an intended application substrate. For instance, a user 114 may select skin tone, wall color, wood type, wall texture, etc.

In another example, a user 114 may upload a data item (e.g., image, video, etc.) of the intended application substrate. The image processing module 126 may perform image processing techniques on the data item. Based at least in part on the image processing, the image processing module 126 may output data indicating one or more characteristics associated with the intended application substrate. For instance, the image processing module 126 may output data indicating a skin tone, wall color, wood type, wall texture, etc. In yet additional and/or alternative examples, an image capturing device (e.g., image capturing device 140) or other specialized computing device may determine one or more characteristics associated with the intended application substrate. For instance, a user 114 may use a specialized computing device to determine his or her skin tone. Or, a user 114 may use a specialized computing device to determine a color and/or texture of a wall where a product 104 is likely to be applied. The image capturing device and/or other specialized computing device may provide data corresponding to the characteristics to the presentation module 132.

Block 606 illustrates comparing the at least one characteristic with characteristics associated with the enhanced images that have been previously generated. The presentation module 132 may access enhanced images that are mapped to, or otherwise associated with, the product 104 and corresponding product profile 138. The presentation module 132 may analyze the enhanced images to determine characteristics that are associated with the enhanced images. In some examples, the presentation module 132 may compare the at least one characteristic with characteristics associated with enhanced images that have been previously generated to determine whether the at least one characteristic is within a threshold of the characteristics associated with the enhanced images that have been previously generated, as illustrated in Block 608. If the at least one characteristic and a corresponding characteristic of the characteristics associated with enhanced images that have been previously generated are within a threshold or a range, the presentation module 132 may access the enhanced image that has been previously generated. Block 610 illustrates accessing at least one enhanced image associated with the product of interest.

For instance, the presentation module 132 may determine that the at least one characteristic is associated with a particular skin tone. The presentation module 132 may compare the skin tone determined by the presentation module 132 to skin tones represented in enhanced images that have been previously generated and are mapped, or otherwise associated with, the product 104 in the database 134. If the particular skin tone and a skin tone of one of the skin tones represented in with enhanced images that have been previously generated are within a threshold or a range, the presentation module 132 may determine that there is an enhanced image that has been previously generated that may be accessed.

In contrast, if the at least one characteristic and a corresponding characteristic of the characteristics associated with enhanced images that have been previously generated are outside of a threshold or a range, the presentation module 132 may determine that there is not an enhanced image that has been previously generated that may be accessed. For instance, the particular skin tone and a skin tone of one of the skin tones represented in with enhanced images that have been previously generated are not within a threshold or a range, the presentation module 132 may determine that there is not an enhanced image that has been previously generated that may be accessed. In such examples, the presentation module 132 may cause an enhanced image to be generated in real time or near real time. Block 612 illustrates generating at least one enhanced image.

In some examples, the enhanced image generation module 130 may leverage one or more algorithms to make adjustments to previously generated enhanced images. For instance, as described above, the enhanced image generation module 130 may perform various image processing techniques to modify the presentation of the enhanced image. The image processing techniques may modify the presentation of the enhanced image such to improve the accuracy of the depiction of the product 104. For instance, the enhanced image generation module 130 may access data associated with the highlights and/or shadows, or other parameters, that is mapped to, or other otherwise associated with the product 104, and may modify the presentation of a previously generated enhanced image by positioning layers on top of or under a layer associated with a background image. In at least one example, the highlights and/or shadows, or other parameters, may be associated with one or more algorithms that are stored in the database 134, as described above. Execution of the one or more algorithms may cause one or more layers to be applied to a previously generated enhanced image to generate an enhanced image based on the at least one characteristic.

Block 614 illustrates generating a user interface based at least in part on the enhanced image. The presentation module 132 may generate user interfaces that provide functionality for the user 114 to select a product 104 and receive information about how the product 104 is likely to appear on an intended application substrate. The user interfaces may include at least one enhanced image. In FIG. 1, user interface 146 illustrates a product detail page associated with a lipstick that can be displayed via a display 144 of a device 116. In some examples, a user interface may include a plurality of enhanced images associated with the product 104. In such examples, each enhanced image of the plurality of enhanced images may be associated with a unique characteristic (e.g., color, wood, etc.). As a non-limiting example, if the product 104 is lipstick, each enhanced image of the plurality of enhanced images may be associated with a unique color of the lipstick and/or a unique finish of the lipstick.

Block 616 illustrates causing a user interface to be presented via a device 116 associated with a user 114. The presentation module 132 may cause the user interfaces (e.g., user interface 146) to be presented to the user 114 via a website, text message, an email, a push notification, etc. The presentation module 132 may generate user interfaces that improve the ability of the service provider 110 to display information that accurately resembles the intended application of a product 104 and enable the user 114 to interact with the service provider 110. That is, by utilizing the color swatches determined based at least in part on an image of the product 104 applied to a substrate and/or situated in an environment substantially similar to the substrate and/or environment that the product 104 is likely to be applied and/or situated, the presentation module 132 may generate user interfaces that improve the ability of the service provider 110 to display information that accurately resemble the intended application of a product 104, and enable the user 114 to interact with the service provider 110.

Figure 7:
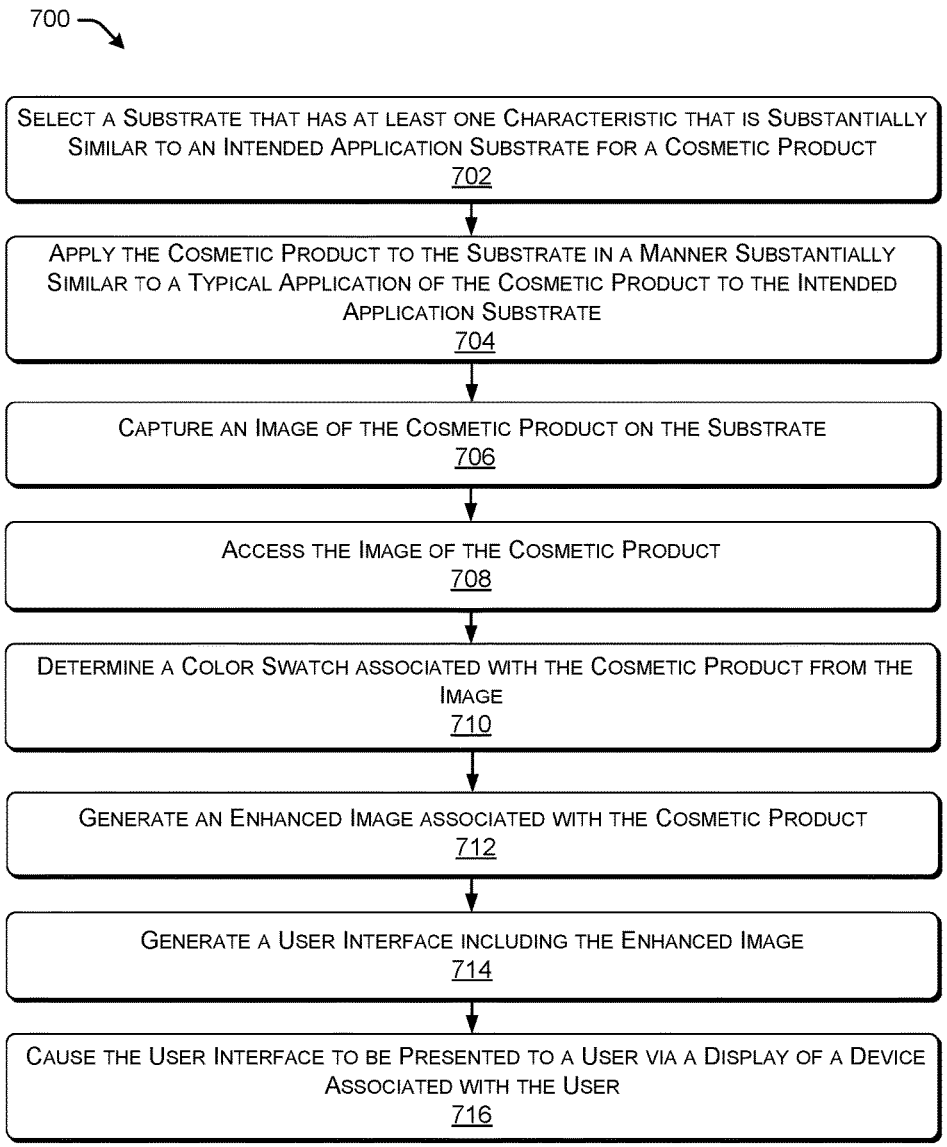
FIG. 7 is a flow diagram showing an illustrative process to generate a user interface utilizing an enhanced image and causing the user interface to be presented via a device associated with a user in the context of a cosmetic product.

FIG. 7 is a flow diagram showing an illustrative process 700 to generate a user interface utilizing an enhanced image and causing the user interface to be presented via a device 116 associated with a user 114 in the context of a cosmetic product.

Block 702 illustrates selecting a model substrate 106 that has at least one characteristic that is substantially similar to an intended application substrate for a cosmetic product (e.g., product 104). That is, a model substrate 106 may be selected that has one or more characteristics that are substantially similar to a portion of a body that corresponds to the intended application substrate. For instance, as a non-limiting example, the model substrate 106 may have one or more characteristics that are substantially similar to lips, skin, etc. The cosmetic product may be applied to the model substrate 106 and/or situated in an environment such that one or more characteristics of the cosmetic product, the model substrate 106, and/or the environment affect the perceived color of the cosmetic product. The one or more characteristics may include color (e.g., skin tone), degree of transparency/degree of opacity, absorbency, texture, finish, etc. That is, the model substrate 106 may have one or more characteristics that are substantially similar to skin. The one or more characteristics may affect the perceived color of the cosmetic product 104 when applied to lips, skin, etc. of the wearer.

Block 704 illustrates applying the cosmetic product to the model substrate 106 in a manner substantially similar to a typical application of the cosmetic product to the intended application substrate. In at least one example, the cosmetic product may be applied to the model substrate 106 consistent with typical use or expected use of the cosmetic product. For instance, in a non-limiting example where a cosmetic product is a cream, a gloss, lipstick, etc., the cosmetic product may be applied so to avoid layering the cosmetic product on too thick or too thin, in a quantity that is too much or too little, etc. That is, the cosmetic product may be applied to the model substrate 106 in such a manner to ensure that the coverage is consistent with the intended application.

Block 706 illustrates capturing an image of the cosmetic product on the model substrate 106. As described above, the one or more content server(s) 118 may be associated with an image capturing device 140. In some examples, the image capturing device 140 captures images of a cosmetic product applied to a color display mechanism 102, as described above (e.g., image 142). That is, in some examples, the image capturing device 140 may capture an image of the cosmetic product applied to the model substrate 106, as described above.

Block 708 illustrates accessing the image of the cosmetic product. The color determination module 124 may access an image (e.g., image 142) associated with a cosmetic product, as described above. In at least one example, the image (e.g., image 142) may resemble the cosmetic product, in a particular color, applied to the model substrate 106 that is substantially similar to the intended application substrate of the cosmetic product.

Block 710 illustrates determining a color swatch associated with the cosmetic product from the image. The color determination module 124 may determine a color swatch associated with a color of a cosmetic product. As described above, a color swatch may be a group of pixels of different colors that collectively represent a color of a cosmetic product applied to an intended application substrate and/or situated in an intended environment. The color determination module 124 may select a portion of the image (e.g., image 142) associated with the cosmetic product as the color swatch for the particular color of the cosmetic product. In at least one example, the portion of the image selected may be a portion of the image where at least a portion of the model substrate 106 is visible under the cosmetic product such that the cosmetic product is being affected by the characteristics of the model substrate 106. Additionally, the portion of the image selected may be a portion of the image that is not in a noticeable shadow or highlight to ensure that the color of the cosmetic product is representative of the cosmetic product interacting with the model substrate 106, excluding external factors. That is, the color determination module 124 may select a particular group of pixels corresponding to the cosmetic product in the image (e.g., image 142) as the color swatch representative of the particular color of the product 104. FIG. 1 resembles color swatch 148 as a portion of image 142. The color determination module 124 may average colors associated with individual pixels of the particular group of pixels to determine the color of the color swatch. Color swatches may be mapped to product profiles 138 stored in the database 134.

Block 712 illustrates generating an enhanced image associated with the cosmetic product. Generating an enhanced image is described in more detail in FIG. 4, above. As described above, in at least one example, the enhanced image generation module 130 may access the database 134 and access data associated with the cosmetic product that is stored in a corresponding product profile 138. For instance, the enhanced image generation module 130 may access a background image that is mapped to, or otherwise associated with, the cosmetic product. In a non-limiting example where the cosmetic product is lipstick, the background image may be an image of a model wearing lipstick and the region of the lips where the lipstick has been applied may be modified to depict a color corresponding to the resulting color swatch. Or, in a non-limiting example where the cosmetic product is blush, the background image may be an image of a model wearing blush and the region of the face corresponding to where the blush is applied may be modified to depict a color corresponding to the resulting color swatch.

As described above, the enhanced image generation module 130 may access the database 134 and access data associated with the cosmetic product that is stored in a corresponding product profile 138. For instance, the enhanced image generation module 130 may access a background image associated with the cosmetic product. In at least one example, the enhanced image generation module 130 may determine a region of the background image depicting where the cosmetic product has been applied to a model. In some examples, the region may be determined by a manual process. In other examples, the region may be determined by the enhanced image generation module 130 based at least in part on features associated with the background image (e.g., points, edges, objects, etc.). The enhanced image generation module 130 may mask portions of the background image such to identify the region of the background image that is associated with a cosmetic product. A mask may hide a portion of an image from a layer. Based at least in part on masking portions of the background image, the region of the background image that is associated with the cosmetic product may be subject to various layers that affect the appearance of the cosmetic product but do not affect other portions of the background image.

In at least one example, the enhanced image generation module 130 may position a layer associated with a color under a layer associated with the background image. The layer associated with the color may affect the portion of the background image corresponding to the cosmetic product. As described above, a color associated with the layer may be determined based at least in part on a color swatch (e.g., color swatch 148), as determined by the color determination module 124. The enhanced image generation module 130 may access a color swatch corresponding to the cosmetic product. That is, the enhanced image generation module 130 may cause a layer associated with the color swatch to be positioned under the layer associated with the background image such that the region of the background image corresponding to the cosmetic product is associated with the color of the color swatch. As a non-limiting example, the enhanced image generation module 130 may determine the location of the lips of a subject depicted in an image where lipstick is intended to be applied, and may cause a layer associated with a color swatch to be applied under the background image such that the lips of the subject in the image correspond to the color in the color swatch. Or, as another non-limiting example, the enhanced image generation module 130 may determine a location of the cheeks of a subject depicted in an image where blush is intended to be applied, and may cause a layer associated with a color swatch to be applied under the background image such that the cheeks of the subject in the image correspond to the color in the color swatch.

The enhanced image generation module 130 may perform additional and/or alternative image processing techniques to modify the presentation of the enhanced image. The image processing techniques may further modify the presentation of the enhanced image such to improve the accuracy of the depiction of the cosmetic product. For instance, the enhanced image generation module 130 may access data associated with the highlights and/or shadows, or other parameters, that is mapped to, or other otherwise associated with the cosmetic product, and may determine position additional layers on top of the layer associated with the background image to modify the presentation of the enhanced image. In at least one example, the highlights and/or shadows, or other parameters, may be associated with one or more algorithms that are stored in the database 134. The enhanced image generation module 130 may execute the one or more algorithms to determine the one or more layers to be applied to a background image to generate an enhanced image.

In at least one example, the enhanced image generation module 130 may access layers associated with textures or finishes to enhance the background image. Such layers may be positioned on top of the layer associated with the background image. Or, the enhanced image generation module 130 may access layers for darkening or lightening the color of the product 104 based at least in part on variations of the color of the intended application substrate. In at least one example, such layers may be positioned on top of the layer associated with the background image but under the layer associated with the highlights and/or shadows, or other parameters. Based at least in part on the image processing of the background image, the enhanced image generation module 130 may generate enhanced images that accurately resemble how a cosmetic product appears on an intended application substrate. Each enhanced image associated with a cosmetic product may be mapped, or otherwise associated with, the cosmetic product and stored in the database 134 in a corresponding product profile 138, as described below.

Block 714 illustrates generating a user interface including the enhanced image. The presentation module 132 may generate user interfaces that provide functionality for the user 114 to select a cosmetic product and receive information about how the cosmetic product is likely to appear on an intended application substrate. The user interfaces may include at least one enhanced image. In FIG. 1, user interface 146 illustrates a product detail page associated with a lipstick that can be displayed via a display 144 of a device 116. In some examples, a user interface may include a plurality of enhanced images associated with the cosmetic product. In such examples, each enhanced image of the plurality of enhanced images may be associated with a unique characteristic. As a non-limiting example, if the cosmetic product is lipstick, each enhanced image of the plurality of enhanced images may be associated with a unique color of the lipstick and/or a unique finish of the lipstick.

Block 716 illustrates causing the user interface to be presented to a user 114 a display 144 of a device 116 associated with the user 114. The presentation module 132 may cause the user interfaces (e.g., user interface 146) to be presented to the user 114 via a website, text message, an email, a push notification, etc. The presentation module 132 may generate user interfaces that improve the ability of the service provider 110 to display information that accurately resembles the intended application of a cosmetic product and enable the user 114 to interact with the service provider 110. That is, by utilizing the color swatches determined based at least in part on an image of the cosmetic product applied to a substrate and/or situated in an environment substantially similar to the substrate and/or environment that the cosmetic product is likely to be applied and/or situated, the presentation module 132 may generate user interfaces that improve the ability of the service provider 110 to display information that accurately resemble the intended application of a cosmetic product, and enable the user 114 to interact with the service provider 110.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
    selecting a model substrate that is based at least in part on a first color of an intended application substrate for a product and at least one of a degree of transparency, an absorbency, a texture, or a finish of the intended application substrate for the product;
    applying the product to the model substrate in a manner based at least in part on an expected application;
    accessing, via a computing device, a first image of the product applied to the model substrate;
    determining, via the computing device, a color swatch corresponding to the product based at least in part on the first image, the color swatch representing a second color of the product that is perceived based at least in part on the product interacting with the model substrate;
    generating, via the computing device, an enhanced image based at least in part on:
        accessing a second image depicting the product applied to the intended application substrate in an environment of use, the second image being associated with a first layer of the enhanced image;
        positioning a second layer associated with the color swatch under the first layer to cause the second color to be applied to a region of the second image associated with the product; and
        positioning a third layer associated with a parameter on top of the first layer, the parameter being associated with at least one of a highlight or a shadow;
    generating, via the computing device, a user interface configured to present information about the product to a user, the user interface including the enhanced image; and
    causing, via the computing device, the user interface to be presented to the user via a display of a device associated with the user.

2. The method of claim 1, further comprising:
accessing a third image of the product on the intended application substrate in an environment of use;
performing image processing on the third image; and
determining the parameter based at least in part on the image processing on the third image.

3. The method of claim 1, further comprising determining the color swatch corresponding to the product based at least in part on:
selecting a plurality of pixels from an area of the first image where at least a portion of the model substrate is visible under the product, individual pixels of the plurality of pixels being associated with different colors; and
determining the second color based at least in part on averaging the individual pixels of the plurality of pixels.

4. The method of claim 1, wherein the intended application substrate is skin and the first color corresponds to skin tone.

5. A method comprising:
accessing, by a computing device, a first image of a product on a color display mechanism, at least a portion of the color display mechanism including a model substrate having a first color and a first characteristic that are selected based at least in part on an intended application substrate for the product;
determining, by the computing device, a color swatch corresponding to the product based at least in part on the first image, the color swatch corresponding to a plurality of pixels of different colors that collectively represent a second color of the product as it is perceived based at least in part on the product interacting with the model substrate; and
generating, by the computing device, an enhanced image based at least in part on:
a first layer comprising a second image depicting the product applied to the intended application substrate in an environment of use;
a second layer comprising the second color in a region associated with the second image corresponding to the product; and
a third layer associated with a parameter, the parameter associated with at least one of a highlight or a shadow.

6. The method of claim 5, wherein the first characteristic is at least one of a degree of opacity, a degree of transparency, an absorbency, a texture, or a finish.

7. The method of claim 5, wherein the first characteristic is a same variation of color within the intended application substrate.

8. The method of claim 5, further comprising:
receiving input from a user indicating that a particular intended application substrate for the product is a third color; and
determining that a degree of color separation between the first color and the third color is less than a threshold; and
wherein generating the enhanced image is further based at least in part on determining that the degree of color separation is less than the threshold.

9. The method of claim 5, further comprising:
receiving input from a user indicating that a particular intended application substrate for the product is a third color;
determining that a degree of color separation between the first color and the third color is greater than a threshold; and
wherein generating the enhanced image is further based at least in part on:
positioning the second layer under the first layer to cause the second color to be applied to the region; and
causing the third layer to be positioned on top of the first layer to affect changes to the second color caused at least in part by the third color.

10. The method of claim 5, further comprising:
determining a second characteristic associated with the product; and
wherein generating the enhanced image is further based at least in part on causing the third layer to be positioned on top of the first layer to affect changes in an appearance of the product caused at least in part by the second characteristic.

11. The method of claim 5, further comprising:
receiving input from a user indicating at least one of the first color or the first characteristic; and
based at least in part on receiving the input from the user, generating the enhanced image in real time or near real time.

12. The method of claim 5, wherein generating the enhanced image is further based at least in part on:
masking out a portion of the second image corresponding to the region; positioning the second layer under the first layer to cause the second color to show through the portion of the second image corresponding to the region; and
positioning the third layer on top of the first layer.

13. The method of claim 5, further comprising:
determining that the product is likely to be of interest to a user based at least in part on user actions associated with at least one of a retail purchase account associated with the user or third-party sources and systems; and
generating a user interface configured to present information about the product to the user, the user interface including the enhanced image.

14. A system comprising:
an image processing device to capture a first image of a cosmetic product that is disposed on a model substrate that is selected based at least in part on a portion of a body corresponding to an intended application substrate;
one or more processors; and
a memory that stores one or more computer-executable instructions that are executable by the one or more processors to cause the system to perform operations comprising:
determining, based at least in part on the first image, a color swatch corresponding to the cosmetic product, the color swatch including a plurality of pixels of different colors that collectively represent a color of the cosmetic product that is disposed on the intended application substrate; and
generating an enhanced image based at least in part on:
a first layer comprising a second image depicting the cosmetic product applied to the intended application substrate;
a second layer comprising the color in a region associated with the second image, wherein the second layer is positioned under the first layer; and a third layer associated with a parameter, the parameter associated with at least one of a highlight or a shadow, wherein the third layer is positioned on top of the first layer.

15. The system as claim 14 recites, wherein the color is a first color and the operations further comprise:
   masking out the region of the second image corresponding to the cosmetic product; and wherein
   positioning the second layer under the first layer to cause a second color to show through the region of the second image.

16. The system as claim 14 recites, wherein the operations further comprise:
   accessing a third image of the cosmetic product that is disposed on the model substrate;
   performing image processing on the third image; and
   determining the parameter based at least in part on the image processing on the third image.

17. The system as claim 14 recites, further comprising a color display mechanism for displaying the cosmetic product on the model substrate, the model substrate having a characteristic that is associated with to the intended application substrate.

18. The system as claim 17 recites, wherein the characteristic comprises a skin tone that is representative of the intended application substrate, the skin tone being a median skin tone in a range of skin tones.

19. The system as claim 17 recites, wherein the characteristic comprises at least one of a degree of opacity, a degree of transparency, an absorbency, a texture, or a finish.

20. The system as claim 17 recites, wherein:
   the model substrate is a second color;
   the model substrate is adhered to a supporting mechanism; and
   the supporting mechanism is a third color that is within a threshold distance of the second color to minimally affect the color of the cosmetic product applied to the model substrate.

\* \* \* \* \*